United States Patent
Dave et al.

(10) Patent No.: US 12,452,337 B2
(45) Date of Patent: Oct. 21, 2025

(54) REMOTE APPLICATION MANAGEMENT

(71) Applicant: Google LLC, Mountain View, CA (US)

(72) Inventors: Yash Dave, Sunnyvale, CA (US); Vicki Vishwanath Amin, San Jose, CA (US)

(73) Assignee: Google LLC, Mountain View, CA (US)

( * ) Notice: Subject to any disclaimer, the term of this patent is extended or adjusted under 35 U.S.C. 154(b) by 71 days.

(21) Appl. No.: 18/480,980

(22) Filed: Oct. 4, 2023

(65) Prior Publication Data

US 2025/0119470 A1    Apr. 10, 2025

(51) Int. Cl.
| | | |
|---|---|---|
| *G06F 13/00* | (2006.01) | |
| *G06F 8/61* | (2018.01) | |
| *G06F 8/65* | (2018.01) | |
| *H04L 9/40* | (2022.01) | |
| *H04L 67/125* | (2022.01) | |
| *H04W 72/02* | (2009.01) | |

(52) U.S. Cl.
CPC .............. *H04L 67/125* (2013.01); *G06F 8/62* (2013.01); *G06F 8/65* (2013.01); *H04L 63/0876* (2013.01); *H04W 72/02* (2013.01)

(58) Field of Classification Search
CPC ..... H04L 67/125; H04L 63/0876; G06F 8/62; G06F 8/65; H04W 72/02
USPC ................. 709/220, 221, 223, 217–219, 238
See application file for complete search history.

(56) References Cited

U.S. PATENT DOCUMENTS

| | | |
|---|---|---|
| 9,098,366 B1 | 8/2015 | Adib et al. |
| 2010/0184422 A1 | 7/2010 | Ahrens |
| 2014/0179272 A1 | 6/2014 | Zhang et al. |
| 2016/0085763 A1 | 3/2016 | Tatourian et al. |
| 2018/0060054 A1 | 3/2018 | Arrouye et al. |
| 2018/0157473 A1 | 6/2018 | Raghavan |
| 2021/0055922 A1 | 2/2021 | Naravanekar et al. |

FOREIGN PATENT DOCUMENTS

| | | |
|---|---|---|
| CN | 115185416 A | 10/2022 |
| WO | 2022271189 A1 | 12/2022 |

OTHER PUBLICATIONS

Invitation to Pay Additional Fees and, Where Applicable, Protest Fee from International Application No. PCT/US2024/049771 dated Dec. 13, 2024, 10 pp.
Elsa, "How to Remotely Control Android Phone/Devices from any Device", Sep. 21, 2023, 12 pp., Retrieved from https://www.airdroid.com.
Mukherjee et al., "Install Android TV apps from smartphone: Here's how you can do it now", Hi Tech, Aug. 21, 2022, 18 pp., Retrieved from https://tech.hindustantimes.com.
International Search Report and Written Opinion of International Application No. PCT/US2024/049771 dated Feb. 3, 2025, 17 pp.

*Primary Examiner* — Kenneth R Coulter
(74) *Attorney, Agent, or Firm* — Shumaker & Sieffert, P.A.

(57) ABSTRACT

A first computing device signed into a user account may determine a management action to be performed by a second computing device signed into the user account to manage one or more applications installed at the second computing device. The first computing device may select a communication channel for sending a request to perform the management action to the second computing device. The first computing device may send, to the second computing device via the communication channel, the request to perform the management action to manage the one or more applications installed at the second computing device.

18 Claims, 11 Drawing Sheets

REMOTE APPLICATION MANAGEMENT

BACKGROUND

A user may use a variety of different computing devices having different form factors. For example, a user may use a smartphone, a smartwatch, and/or an over the top (OTT) device connected to a television. A user may interact with a smartphone or a smartwatch by interacting with a touchscreen provided by the smartphone or the smartwatch, while the user may use a remote control to interact with an OTT device.

SUMMARY

In general, various aspects of the techniques described in this disclosure are directed to a first computing device signed into a user account that is able to remotely manage applications and device settings of a second computing device that is also signed into the same user account. The first computing device may be able to remotely install, uninstall, update, open, and/or archive applications at the second computing device. The first computing device may also be able to remotely modify device settings of the second computing device and to remotely free up storage space (or, in other words, reduce storage space consumption by removing application(s) and/or other data) at the second computing device by uninstalling or archiving applications at the second computing device.

The first computing device may determine a management action that is to be performed by the second computing device. The management action may be an application management action such as installing, uninstalling, updating, opening, and/or archiving one or more applications at the second computing device. The management action may also be a device management action such as an action to reduce storage space consumption at the second computing device by auto-archiving unused applications and/or automatically uninstalling unused applications that the second computing device.

The first computing device may send, to the second computing device, a request to perform a management action. The first computing device may send the request to perform the management action to the second computing device by directly communicating with the second computing device via a short range wireless connection with the second computing device or over the Internet via a remote server. The second computing device may receive the request to perform the management action and may, in response perform the management action indicated by the request.

In some aspects, the techniques described herein relate to a method including: determining, by one or more processors of a first computing device signed into a user account, a management action to be performed by a second computing device signed into the user account to manage one or more applications installed at the second computing device; selecting, by the one or more processors, a communication channel for sending a request to perform the management action to the second computing device; and sending, by the one or more processors and to the second computing device via the communication channel, the request to perform the management action to manage the one or more applications installed at the second computing device.

In some aspects, the techniques described herein relate to a computing device including: a memory that stores instructions; and one or more processors that execute the instructions to: determine a management action to be performed by a second computing device to manage one or more applications installed at the second computing device, wherein the computing device and the second computing device are signed into the same user account; select a communication channel for sending a request to perform the management action to the second computing device; and send, to the second computing device via the communication channel, the request to perform the management action to manage the one or more applications installed at the second computing device.

In some aspects, the techniques described herein relate to a computer-readable storage medium storing instructions that, when executed, cause one or more processors of a computing device to: determine a management action to be performed by a second computing device to manage one or more applications installed at the second computing device, wherein the computing device and the second computing device are signed into the same user account; select a communication channel for sending a request to perform the management action to the second computing device; and send, to the second computing device via the communication channel, the request to perform the management action to manage the one or more applications installed at the second computing device.

In some aspects, the techniques described herein relate to a method including: receiving, by one or more processors of a first computing device, a request to perform a management action; in response to receiving the request to perform the management action, authenticating, by the one or more processors, that the request is sent by a second computing device signed into a same user account as the first computing device and verifying, by the one or more processors, the request as being intended for the first computing device; and in response to successfully authenticating that the request is sent by the second computing device signed into the same user account as the first computing device and successfully verifying the request as being intended for the first computing device, performing, by the one or more processors, the management action.

In some aspects, the techniques described herein relate to a computing device including: a memory that stores instructions; and one or more processors that execute the instructions to: receive a request to perform a management action; in response to receiving the request to perform the management action, authenticate that the request is sent by a second computing device signed into a same user account as the computing device and verify the request as being intended for the computing device; and in response to successfully authenticating that the request is sent by the second computing device signed into the same user account as the computing device and successfully verifying the request as being intended for the computing device, perform the management action.

In some aspects, the techniques described herein relate to a computer-readable storage medium storing instructions that, when executed, cause one or more processors of a computing device to: receive a request to perform a management action; in response to receiving the request to perform the management action, authenticate that the request is sent by a second computing device signed into a same user account as the computing device and verify the request as being intended for the computing device; and in response to successfully authenticating that the request is sent by the second computing device signed into the same user account as the computing device and successfully verifying the request as being intended for the computing device, perform the management action.

The details of one or more examples are set forth in the accompanying drawings and the description below. Other features, objects, and advantages of the disclosure will be apparent from the description and drawings, and from the claims.

DETAILED DESCRIPTION

Figure 1:
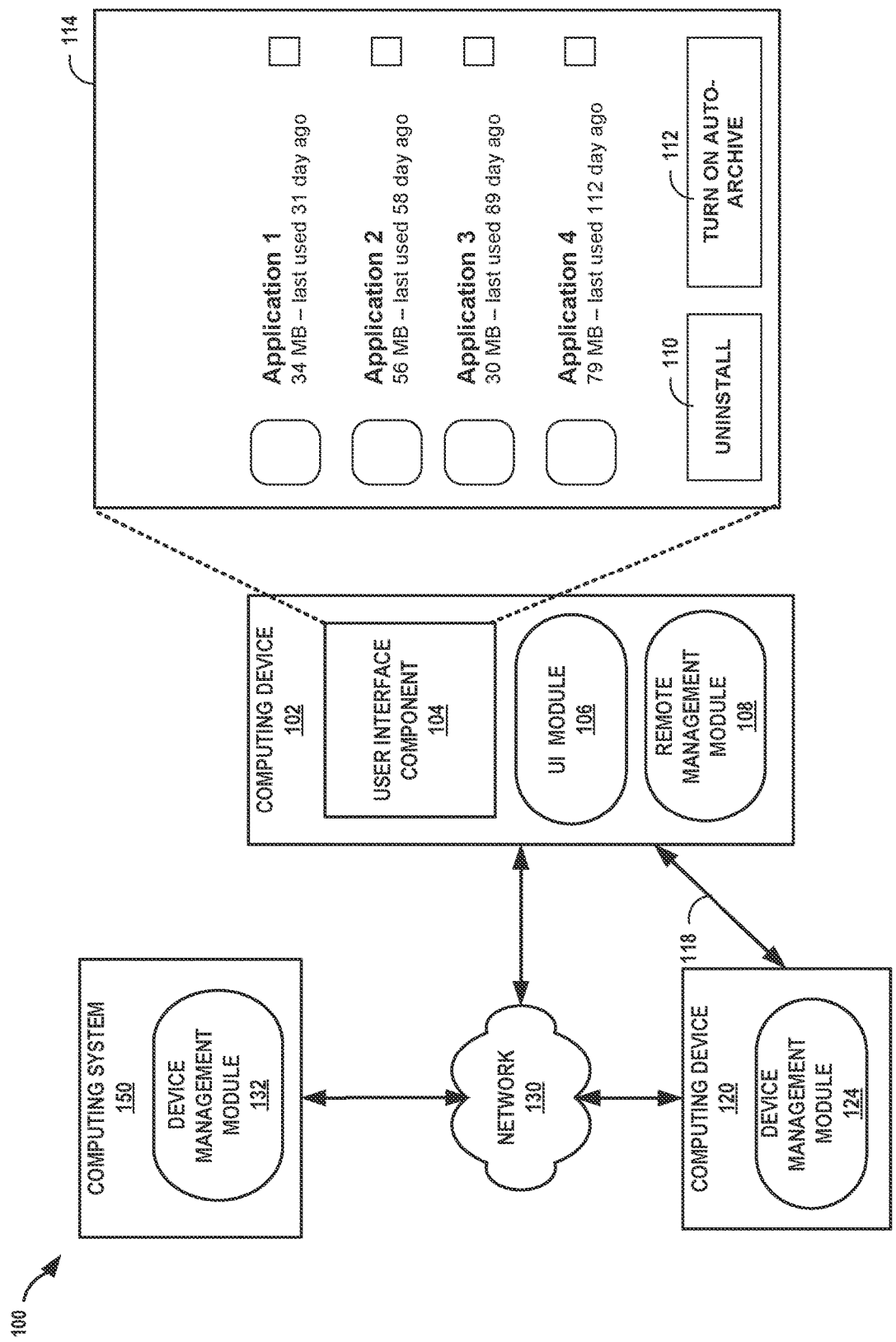
FIG. 1 is a conceptual diagram illustrating an example environment in which an example computing device is configured to perform remote management of other computing devices, in accordance with one or more aspects of the present disclosure.

FIG. 1 is a conceptual diagram illustrating an example environment in which an example computing device is configured to perform remote management of other computing devices, in accordance with one or more aspects of the present disclosure. In the example of FIG. 1, environment 100 may include a computing device 102, a computing device 120, and a computing system 150 that communicate via a network 130.

Computing system 150 may be any suitable remote computing system, such as one or more desktop computers, laptop computers, mainframes, servers, cloud computing systems, virtual machines, etc. capable of sending and receiving information via network 130. In some examples, computing system 150 may represent a cloud computing system that provides one or more services via network 130. That is, in some examples, computing system 150 may be a distributed computing system. One or more computing devices, such as computing device 102 and/or computing device 120, may access the services provided by the cloud by communicating with computing system 150. While described herein as being performed at least in part by computing system 150, various aspects of the techniques of the present disclosure may be performed by one or more other devices, such as computing device 102 or computing device 120. That is, in some examples, computing device 102 and/or computing device 120 may be operable to perform one or more techniques of the present disclosure alone.

Computing system 150 may include device management module 132. Device management module 132 may perform operations described herein using software, hardware, firmware, or a mixture of both hardware, software, and firmware residing in and executing on computing system 150 or at one or more other remote computing devices. In some examples, device management module 132 may be implemented as hardware, software, and/or a combination of hardware and software. Computing system 150 may execute device management module 132 with one or more processors. Computing system 150 may execute device management module 132 as or within a virtual machine executing on underlying hardware.

Device management module 132 may be implemented in various ways. For example, device management module 132 may be implemented as a downloadable or pre-installed application or "app." In another example, device management module 132 may be implemented as part of an operating system of computing system 150. Other examples of computing system 150 that implement techniques of this disclosure may include additional components not shown in FIG. 1.

Computing system 150 may act as an application distribution platform, such as an app marketplace, for computing devices such as computing device 102 and computing device 120. For example, computing system 150 may store a repository of applications that can be installed at computing devices, and computing devices may communicate with computing system 150 to download and install applications and to download and install updates for applications.

Computing system 150 may execute device management module 132 to track and store, at computing system 150, various information associated with each of the computing devices that communicate with computing system 150 to download and install applications. For example, device management module 132 may track and store application information for each computing device that communicates with computing system 150, such as the applications installed at each computing device, the version of each of the applications installed at each computing device, the size of each application installed at each computing device, whether updates are available for each application installed at each computing device, and/or the last time each application was opened at each computing device.

Device management module 132 may also track and store, at computing system 150, device information and device settings for each computing device that communicates with computing system 150, such as the amount of available storage space at each computing device, and/or device settings, such as whether auto-archiving of unused applications or auto-updating of applications is turned on, at each computing device and the like. In some examples, device management module 132 also periodically performs scans of each of the computing devices that communicate with computing system 150, such as by performing virus scans, scanning each of the computing devices for performance issues, tracking applications crashes at each of the computing devices, and the like, and device management module 132 may store the results of such scans at computing system 150.

Network 130 may be any suitable network that enables communication between computing device 102, computing devices 120, and/or computing system 150. Network 130 may include a wide-area network such as the Internet, a local-area network (LAN), a personal area network (PAN) (e.g., Bluetooth®), an enterprise network, a wireless network, a cellular network, a telephony network, a Metropolitan area network (e.g., WiFi™, WAN, WiMAX, etc.), one or more other types of networks, or a combination of two or more different types of networks (e.g., a combination of a cellular network and the Internet).

Computing device 102 and computing device 120 may include, but is not limited to, portable or mobile devices such as mobile phones (including smart phones), laptop computers, tablet computers, wearable computing devices such as smart watches or computerized eyewear, smart television platforms such as over the top (OTT) devices, cameras, computerize appliances, vehicle head units, etc. In some examples, computing device 102 may be a smart phone or a tablet computer while computing device 120 may be a wearable computing device, a smart television platform, or a vehicle head unit.

Computing device 120 may include device management module 124. Device management module 124 may perform operations described herein using software, hardware, firmware, or a mixture of both hardware, software, and firmware residing in and executing on computing device 120. In some examples, device management module 124 may be implemented as hardware, software, and/or a combination of hardware and software. Computing device 120 may execute device management module 124 with one or more processors. Device management module 124 may be implemented in various ways. For example, device management module 124 may be implemented as a downloadable or pre-installed application or "app." In another example, device management module 124 may be implemented as part of an operating system of computing device 120. Other examples of computing devices 120 that implement techniques of this disclosure may include additional components not shown in FIG. 1.

Computing device 102 may include user interface component 104 ("UIC 104") user interface module 106 ("UI module 106"), and remote management module 108. UI module 106 and remote management module 108 may perform operations described herein using software, hardware, firmware, or a mixture of both hardware, software, and firmware residing in and executing on computing device 102 or at one or more other remote computing devices. In some examples, UI module 106 and remote management module 108 may be implemented as hardware, software, and/or a combination of hardware and software. Computing device 102 may execute UI module 106 and remote management module 108 with one or more processors. UI module 106 and remote management module 108 may be implemented in various ways. For example, any of UI module 106 and remote management module 108 may be implemented as a downloadable or pre-installed application or "app." In another example, any of UI module 106 and remote management module 108 may be implemented as part of an operating system of computing device 102. Other examples of computing device 102 that implement techniques of this disclosure may include additional components not shown in FIG. 1.

UIC 104 of computing device 102 may function as an input device for computing device 102 and as an output device. For instance, UIC 104 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. UIC 104 may function as an output device using any one or more of a liquid crystal display (LCD), dot matrix display, light emitting diode (LED) display, microLED, organic light-emitting diode (OLED) display, e-ink, or similar monochrome or color display capable of outputting visible information to the user of computing device 102.

In some examples, UIC 104 may include a presence-sensitive screen that may receive tactile user input from a user of computing device 102. UIC 104 may receive the tactile user input by detecting one or more taps and/or gestures from a user of computing device 102 (e.g., the user touching or pointing to one or more locations of UIC 104 with a finger or a stylus pen). The presence-sensitive screen of UIC 104 may present output to a user. UIC 104 may present the output as a user interface, which may be related to functionality provided by computing device 102. For example, UIC 104 may present various functions and applications executing on computing device 102 such as an electronic message application, a messaging application, a map application, etc.

UI module 106 may interpret inputs detected at UIC 104 (e.g., as a user provides one or more gestures at a location of UIC 104 at which a user interface is displayed). UI module 106 may relay information about the inputs detected at UIC 104 to one or more associated platforms, operating systems, applications, and/or services executing at computing device 102 to cause computing device 102 to perform a function. UI module 106 may also receive information and instructions from one or more associated platforms, operating systems, applications, and/or services executing at computing device 102 (e.g., remote management module 108) for generating a graphical user interface (GUI). In addition, UI module 106 may act as an intermediary between the one or more associated platforms, operating systems, applications, and/or services executing at computing device 102 and various output devices of computing device 102 (e.g., speakers, LED indicators, vibrators, etc.) to produce output (e.g., graphical, audible, tactile, etc.) with computing device 102.

In the example of FIG. 1, an application executing at computing device 102, such as remote management module 208, may send data to UI module 106 that causes UIC 104 to generate user interfaces (e.g., user interface 114) and elements thereof. In response, UI module 106 may output instructions and information to UIC 104 that cause UIC 104 to display a user interface (e.g., user interface 114) according to the information received from the application. When handling input detected by UIC 104, UI module 106 may receive information from UIC 104 in response to inputs detected at locations of a screen of UIC 104 at which elements of the user interface are displayed. UI module 106 disseminates information about inputs detected by UIC 104 to other components of computing device 102 for interpreting the inputs and for causing computing device 102 to perform one or more functions in response to the inputs.

A user may interact with computing device 120 via a user interface device associated with computing device 120 to select various management actions that computing device 120 may perform, such as installing or uninstalling applications, updating applications installed at computing device 120, managing system settings such as automatically installing updates to applications or automatically archiving unused applications, and the like. In some examples, computing device 120 may have a very limited amount of storage space (e.g., 4 gigabytes of storage space, 8 gigabytes of storage space, etc.), and a user of computing device 120 having such limited storage space may have to constantly select management actions that may free up storage space at computing device 120, such as archiving unused applications, in order to free up storage space at computing device 120.

The user interface device that the user uses to interact with computing device 120 may correspond to the form factor of computing device 120. In the example where computing device 120 is a smartphone, a tablet computer, or a smartwatch, the user interface device of computing device 120 may be a touchscreen. The size of the touchscreen may be relatively large (e.g., 5 inches or greater) in examples where computing device 120 is a smartphone or a tablet computer and may be relatively small (e.g., 2 inches or less) in examples where computing device is a smartwatch. In examples where computing device 120 is an OTT device, the user interface device of computing device 120 may be a remote control that wirelessly communicates with the OTT device. In examples where computing device 120 is an infotainment system in a vehicle such as a car or a truck, the user interface device of computing device 120 may include buttons and dials in the vehicle.

While the relatively large touchscreen of a smartphone or a tablet computer may enable a user to easily interact with the smartphone or tablet computer to select management actions for the smartphone or tablet computer to perform, it may be more challenging for a user to interact with the relatively small touchscreen of a smartwatch in order to select management actions for the smartwatch to perform. Furthermore, an OTT device connected to a television may primarily be a media consumption device that the user may control using a remote control to browse through and play media such as movies, television shows, and other videos, and the user interface of such an OTT device may not be designed for a user to be able to easily interact with the OTT device to select management actions to be performed by the OTT device. As such, a user may have to provide numerous user interactions using the remote control in order to select management actions, such as uninstalling or updating applications, changing auto-archive settings, and the like, that are to be performed by the OTT device.

A user may own and/or use a variety of different computing devices. For example, a user may, in addition to using a smartphone, also use a smartwatch and an OTT device connected to a television. The computing devices used by the user may be signed into the same user account associated with the user. Such a user account may serve as a centralized account for the computing devices used by the user to enable each of the computing devices to link the computing devices to the user and to enable the computing devices access various services and products, synchronize data, purchase apps and content, and the like. For example, applications installed at computing devices signed into a user account may also be associated with the user account, such that when a user sets up a new computing device, the user may sign the new computing device into the user account to automatically download, to the new computing device, applications that are associated with the user account.

It should be noted that a user account as described throughout this disclosure is not a superuser account or administrator account used by an administrator in an enterprise to manage computing devices used by a variety of different users in the enterprise. Instead, the user account described throughout this disclosure is used by an end user of multiple computing devices to serve as a centralized account for the end user that is used to link computing devices to the end user and to enable the computing devices of the user to access various services and products, synchronize data, purchase apps and content, and the like.

In accordance with aspects of this disclosure, a user that uses multiple computing devices, such as computing device 102 and computing device 120, that are signed into the same user account associated with the user, may use one of the computing devices used by the user to manage the other computing devices used by the user. The user may select the computing device that is to manage other computing devices used by the user based on factors such as the ease of interacting with the computing device. For example, if the user users a smartphone, a smartwatch, and an OTT device, the user may select the smartphone as the computing device that manages the smartwatch and the OTT device used by the user. The user may use the selected computing device to select management actions that are to be performed by the other computing devices used by the user and to send, to the other computing devices, requests to perform the selected management actions. Computing devices that receive requests to perform management actions may perform the requested management actions. In this way, the techniques of this disclosure may enable a user to use a computing device to manage other computing devices that are also used by the user.

In the example of FIG. 1, computing device 102 and computing device 120 may be signed into the same user account associated with a user, and the user may use computing device 102 to manage computing device 120. The user may interact with computing device 102 to select one or more management actions to be performed by computing device 120, and computing device 102 may send, to computing device 120, requests to perform the one or more management actions selected by the user.

The management actions that computing device 102 may request computing device 120 to perform may include application management actions to manage one or more applications at computing device 120. The application management actions may include installing and/or uninstalling one or more applications at computing device 120, updating one or more applications installed at computing device 120, opening one or more applications installed at computing device 120, and automatically archiving unused applications at computing device 120. The management actions may also include device management actions to manage one or more device settings at computing device 120, such as by changing one or more device settings of computing device 120.

Computing device 102 may execute remote management module 108 to communicate with computing system 150 to receive, from computing system 150, information associated with other computing devices, such as computing device 120, that are signed into the same user account as computing device 102. The information associated with other computing devices that are signed into the same user account as computing device 102 may include indications of the computing devices signed into the same user account as computing device 102. The information may also, for each of the other computing devices signed into the same user account as computing device 102, include indications of the applications installed at the computing devices and metadata about each application installed at the computing device (e.g., the version of the application, the size of the application, whether updates are available for the application, the last time the application was opened at the computing device, etc.).

The information may also, for each of the other computing devices signed into the same user account as computing device 102, include indications of device information of the computing device. Such device information of a computing device may include the amount of available storage space at the computing device, system settings and/or device settings of the computing device, information regarding any issues detected at the computing device, and the like.

Computing device 102 may execute remote management module 108 to determine a management action to be performed by computing device 120 to manage one or more applications installed at computing device 120. For example, computing device 102 may present a device management interface that enables a user of computing device 102 to manage application settings and/or device settings of other computing devices, such as computing device 120, signed into the same user account as computing device 102. A user of computing device 102 may interact with the device management interface to select management actions to be taken by one or more other computing devices signed into the same user account as computing device 102, and computing device 102 may send, to the one or more other computing devices, requests to perform the selected management actions.

In the example of FIG. 1, computing device 102 may receive, from computing system 150, information associated with computing device 120, such as information regarding the applications installed at computing device 120 and device information of computing device 120. Remote management module 116 may send data to UI module 106 that causes UIC 104 to display user interface 114 that presents information associated with computing device 120 and management actions that computing device 102 may request computing device 120 to perform.

For example, user interface 114 may present a list of applications installed at computing device 120, and the list may include information about each of the applications, such as the name of the application, the size of the application, and when the application was last opened. A user may interact with user interface 114 to select one or more management actions that computing device 102 may request computing device 120 to perform. For example, a user may interact with user interface 114 to select one or more applications to be uninstalled by computing device 120 and may provide user input at UIC 104 to select uninstall button 110 to select an uninstall action that computing device 102 may request computing device 120 to perform to uninstall the selected one or more applications at computing device 120. In another example, a user may interact with user interface 114 to select auto-archive button 112 to select an auto-archive action that computing device 102 may request computing device 120 to perform to automatically archive applications installed at computing device 120 that have been unused for a specified amount of time (e.g., the last 30 days).

UI module 106 may send, to remote management module 108, an indication of user input that corresponds to the user input selecting a management action, and computing device 102 may execute remote management module 108 to generate a request to perform the management action. For example, if UI module 106 sends, to remote management module 108, an indication of user input that corresponds to the user input selecting an uninstall action and one or more applications to be uninstalled, remote management module 108 may generate a request to perform an uninstall action to uninstall the selected one or more applications. Similarly, if UI module 106 sends, to remote management module 108, an indication of user input that corresponds to the user input selecting an auto-archive action, remote management module 108 may generate a request to perform an auto-archive action to archive unused applications.

To generate the request, remote management module 108 may include, in the request, an indication of the management action to be performed, such as by including, in the request, one or more commands to be executed or otherwise performed by computing device 120. Remote management module 108 may also include metadata associated with the management action. For example, the metadata may indicate one or more applications on which the management action is to be performed, such as by including the package names of the one or more applications.

Remote management module 108 may also including, in the request, information that may enable computing device 120 to authenticate the request as being sent by a computing device signed into the same user account as computing device 120 and to verify the request as being intended for computing device 120. In some examples, remote management module 108 may include, in the request an indication of the computing device sending the request, such as by including a device identifier associated with computing device 102, and an indication of the computing device that is the intended recipient of the request, such as by including a device identifier associated with computing device 120.

When remote management module 108 generates a request to install an application or a request to update an application, remote management module 108 may not include, in the request, a package of the application to be installed or an update package for the application to be updated. That is, the request does not include executable code of the application or executable code of an updater application or patch used to update the application. Instead, the request generated by remote management module 108 is a control signal that instructs computing device 120 to perform the management action. Thus, to perform the requested installation or updating of an application, computing device 120 may communicate with computing system 150 to download the application or to download a patch for updating the application.

In some examples, remote management module 108 may encrypt or digitally sign the request using a cryptographic key that is shared by devices (e.g., computing devices 102 and 120) signed into the same user account. Computing device 120 may therefore be able to use the shared cryptographic key to authenticate the request as being sent by a computing device signed into the same user account as computing device 120 and to verify the request as being intended for computing device 120.

Computing device 102 may send, to computing device 120, a request to perform the management action. In some examples, computing device 102 may send the request to computing device 120 via network 130. For example, computing device 102 may send the request via network 130 to computing system 150, and computing system 150 may in turn forward the request via network 130 to computing device 120. In some examples, computing device 102 may establish short range wireless connection 118 with the computing device 120 and may send the request to computing device 120 via short range wireless connection 118. Examples of short range wireless connection 118 include a Bluetooth® connection, a Bluetooth® Low Energy (BLE) connection, a Wi-Fi® Direct connection, an ultra wideband (UWB) connection, a near-field communication (NFC) connection, a Personal Area Network (PAN), and the like.

In some examples, computing device 102 may send the request to perform the management action to computing device 120 via network 130 regardless of whether computing device 120 is online. Computing device 120 is online when computing device 120 is able to connect to computing system 150 via network 130. Similarly, computing device 120 is offline when computing device 120 is not able to connect to computing system 150 via network 130. For example, computing device 120 may be offline when computing device 120 is turned off or when computing device 120 has turned off hardware, such as one or more W-Fi radios or other radios (including cellular and/or PAN radios), for connecting to network 130.

If computing device 120 is online, computing device 102 may send the request to computing system 150 via network 130, and computing system 150 may forward the request to computing device 120 via network 130. If computing device 120 is offline, computing device 102 may send the request to computing system 150 via network 130, and computing system 150 may wait for computing device 120 to be online and may forward the request to computing device 120 via network 130 when computing device 120 is online.

In some examples, computing device 102 may execute remote management module 108 to attempt to establish short range wireless connection 118 with computing device 120. If computing device 102 is able to establish short range wireless connection 118 with computing device 120, remote management module 108 may send the request to perform the management action to computing device 120 via short range wireless connection 118. If computing device 102 is not able to establish short range wireless connection 118 with computing device 120, remote management module 108 may send the request to perform the management action to computing device 120 via network 130, such as by sending the request to computing system 150 for forwarding to computing devices 120.

In some examples, computing device 102 may execute remote management module 108 may select a communication channel for sending the request to perform the management action to computing device 120 based on the state of computing device 120. The state of computing device 120 may include the online status of computing device 120, such as whether computing device 120 is online or offline, and/or whether computing device 120 is powered on.

Computing device 102 may execute remote management module 108 to determine whether computing devices 120 is online. Computing device 102 may send, to computing system 150 via network 130, a query regarding whether computing device 120 is online, and computing system 150 may, in response to receiving the query, determine whether computing device 120 is online, such as by determining whether computing devices 120 is reachable by computing system 150 via network 130 and/or whether computing devices 120 is connected to computing system 150 (e.g., via a ping). Computing system 150 may therefore send, to computing device 102 via network 130 a response indicating whether computing device 120 is online.

Computing device 102 may execute remote management module 108 to receive, from computing system 150 via network 130, the response indicating whether computing devices 120 is online and to determine, based on the response, whether computing device 120 is online. If remote management module 108 determines that computing device 120 is online, remote management module 108 may send the request to perform the management action to computing device 120 via network 130.

If remote management module 108 determines that computing device 120 is offline, remote management module 108 may attempt to establish short range wireless connection 118 with computing device 120. If computing device 102 is able to establish short range wireless connection 118 with computing device 120, remote management module 108 may send the request to perform the management action to computing device 120 via short range wireless connection 118. If computing device 102 is not able to establish short range wireless connection 118 with computing device 120, remote management module 108 may send the request to perform the management action to computing device 120 via network 130

Computing device 102 may therefore execute remote management module 108 to select a communication channel for sending the request to perform the management action to computing device 120 and may send the request to computing device 120 via the communication channel. Computing device 120 may execute device management module 124 to receive the request to perform the management action and to, in response to receiving the request, perform the management action indicated by the request.

In some examples, computing device 120 may execute device management module 124 to, in response to receiving the request to perform the management action, authenticate the request as being sent by a computing device signed into the same user account as computing device 120 and to verify the request as being intended for computing device 120. If the request includes an indication of the sender of the request, such as a device identifier associated with the sender of the request (e.g., the device identifier of computing device 102), device management module 124 may determine whether the device identifier associated with the sender of the request matches a device identifier of a computing device signed into the user account to authenticate the request as being sent by a computing device signed into the same user account as computing device 120. Similarly, if the request includes an indication of the intended recipient of the request, such as a device identifier associated with the recipient of the request, device management module 124 may determine whether the device identifier associated with the recipient of the request matches the device identifier of computing device 120 to verify the request as being intended for computing device 120.

In some examples, if computing device 102 has encrypted or digitally signed the request using a cryptographic key that is shared by devices (e.g., computing devices 102 and 120) signed into the same user account, device management module 124 may use the shared cryptographic key to authenticate the request as being sent by a computing device signed into the same user account as computing device 120 and to verify the request as being intended for computing device 120, such as by decrypting the request using the shared cryptographic key or by using the shared cryptographic key to verify the digital signature.

Computing device 120 may execute device management module 124 to, in response to successfully authenticating the request as being sent by a computing device signed into the same user account as computing device 120 and in response to successfully verifying the request as being intended for computing device 120, perform the requested management action. For example, if the requested management action is installing a given application at computing device 120, device management module 124 may perform the requested management action by communicating with computing system 150 to download the given application may install the downloaded application.

In another example, if the requested management action is turning on an auto archive setting at computing device 120 to automatically archiving applications installed at computing device 120 that have be unused for a specified amount of time, device management module 124 may perform the management action to turn on the auto archive setting at computing device 120. Device management module 124 may therefore, for applications installed at computing device 120, monitor the last time the applications were opened, and may automatically archive any applications that have not been opened for a specified amount of time, such as the last 30 days. Device management module 124 may archive such applications by deleting data associated with such applications from computing device 120, thereby freeing up storage space at computing device 120.

The techniques of this disclosure provide one or more technical advantages. By enabling a computing device to send requests to perform management actions to other computing devices, the techniques of this disclosure may enable a user to use a single computing device to control the performance of management actions of multiple other computing devices used by the user.

Using a single computing device to control the performance of management actions of multiple other computing devices may improve the ability of the user to manage multiple different computing devices used by the user, and may enable the user to more easily manage such multiple different computing devices to install, uninstall, and/or update applications at the multiple different computing devices, to manage the storage space of each of the multiple different computing devices, and the like. Enabling the user to more easily manage multiple different computing devices used by the user may improve the performance of those different computing devices by increasing the likelihood that applications at those different computing devices are frequently updated to the latest versions of those applications and increasing the likelihood that the storage spaces of those different applications are managed to have enough available storage space for installing new applications and/or downloading other content.

Using a single computing device to control the performance of management actions of multiple other computing devices may also reduce the amount of user interactions with these other computing devices. Reducing the amount of user interactions with these other computing devices may reduce the amount of processing cycles of these computing devices that are used to process user interactions and may also reduce battery usage of these computing devices.

Furthermore, by being able to select between communication channels such as the Internet or a short range wireless connection (e.g., a direct wireless connection, such as Bluetooth™) for sending a request to perform a management action, the techniques of this disclosure may enable such requests to be sent to computing devices that are offline (e.g., not connected to the Internet). As such, a computing device that has no network connection or intermittent network connection may still be able to receive requests to perform management actions.

In addition, by enabling a computing device to send requests to other computing devices to perform management actions only if the computing device is signed into the same user account as the other computing devices, the techniques of this disclosure improves the security of remote management of computing devices. For example, the techniques of this disclosure may prevent computing devices from performing management actions requested by unauthorized computing devices that are not signed into the same user account as the computing devices.

Figure 2:
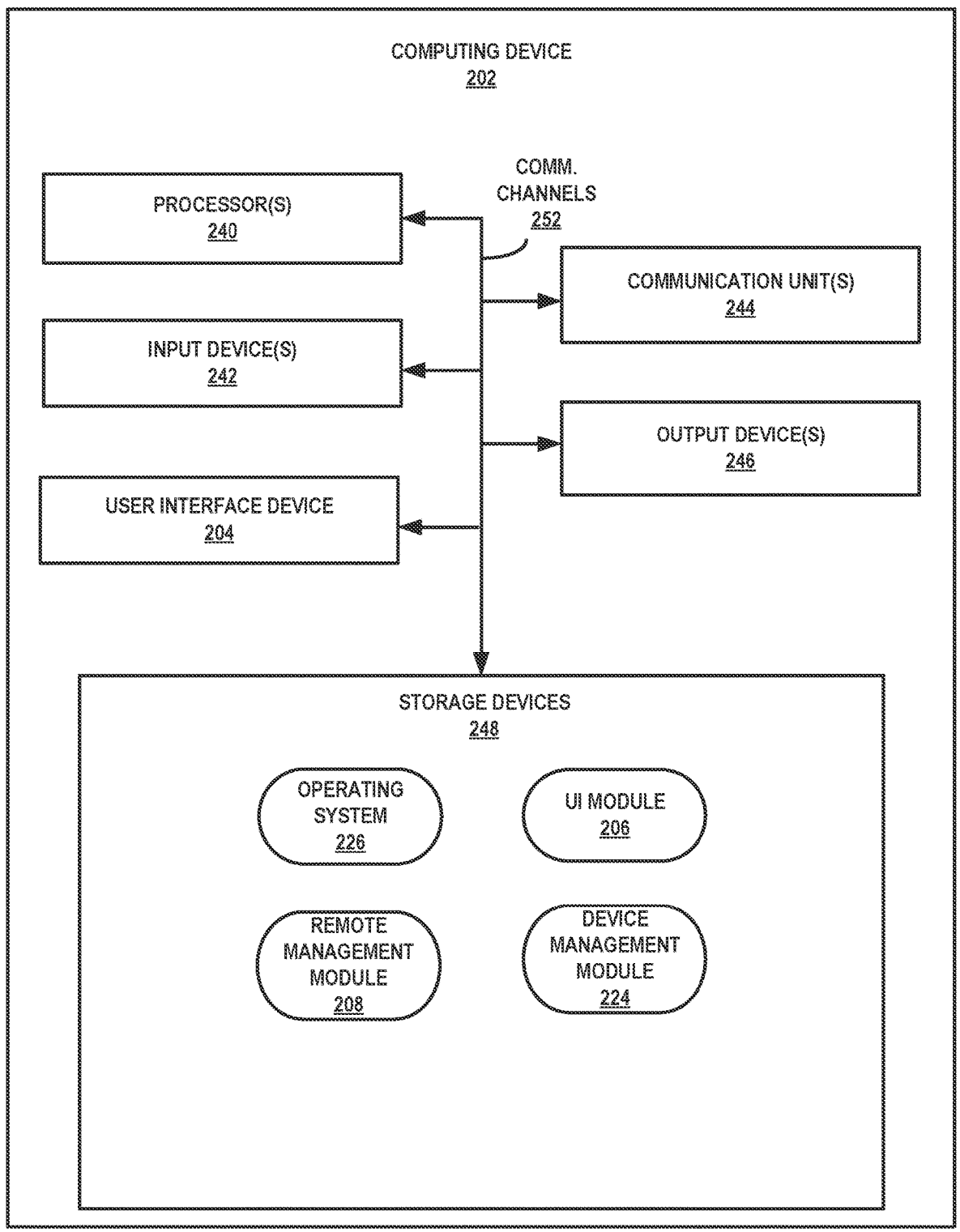
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one particular example of computing device 202, and many other examples of computing device 202 may be used in other instances and may include a subset of the components included in example computing device 202 or may include additional components not shown in FIG. 2. Computing device 202 may be an example of computing device 202 of FIG. 1.

As shown in the example of FIG. 2, computing device 202 includes user interface component 204 ("UIC 204"), one or more processors 240, one or more input devices 242, one or more communication units 244, one or more output devices 246, and one or more storage devices 248. Storage devices 248 of computing device 202 also include operating system 226, UI module 206, remote management module 208, and device management module 224. UI module 206 is an example of UI module 106 of FIG. 1, and remote management module 208 is an example of remote management module 108 of FIG. 1. Device management module 224 is an example of device management module 124 of FIG. 1.

Communication channels 252 may interconnect each of the components 204, 240, 242, 244, 246, and 248 for inter-component communications (physically, communicatively, and/or operatively). In some examples, communication channels 252 may include a system bus, a network connection, one or more inter-process communication data structures, or any other components for communicating data between hardware and/or software.

One or more processors 240 may implement functionality and/or execute instructions within computing device 202. For example, one or more processors 240 on computing device 102 may receive and execute instructions stored by storage devices 248 that provide the functionality of operating system 226, UI module 206, remote management module 208, and device management module 224. These instructions executed by one or more processors 240 may cause computing device 202 to store and/or modify information, within storage devices 248 during program execution. One or more processors 240 may execute instructions of operating system 226, UI module 206, remote management module 208, and device management module 224. That is, operating system 226, UI module 206, remote management module 208, and device management module 224 may be operable by one or more processors 240 to perform various functions described herein.

One or more processors 240 may be or include a digital signal processor (DSP), a general purpose microprocessor, application specific integrated circuit (ASIC), field programmable logic array (FPGA), and/or other equivalent integrated or discrete logic circuitry. One or more input devices 242 of computing device 202 may be configured to receive input. Examples of input are tactile, audio, and video input. Input devices 242 of computing device 202, in one example, includes a presence-sensitive display, touch-sensitive screen, mouse, keyboard, voice responsive system, video camera, microphone or any other type of device for detecting input from a human or machine.

One or more output devices 246 of computing device 202 may be configured to generate output. Examples of output are tactile, audio, and video output. Output devices 246 of computing device 202, in one example, includes a presence-sensitive organic light emitting diode (OLED) display, sound card, video graphics adapter card, speaker, monitor, a presence-sensitive liquid crystal display (LCD), or any other type of device for generating output to a human or machine.

One or more communication units 244 of computing device 202 may communicate with external devices by transmitting and/or receiving data. For example, computing device 202 may use communication units 244 to transmit and/or receive radio signals on a radio network such as a cellular radio network. In some examples, communication units 244 may transmit and/or receive satellite signals on a satellite network such as a Global Positioning System (GPS) network. Examples of communication units 244 include a network interface card (e.g., such as an Ethernet card), an optical transceiver, a radio frequency transceiver, a GPS receiver, or any other type of device that can send and/or receive information. Other examples of communication units 44 may include Bluetooth®, BLE, UWB, NFC, GPS, 3G, 4G, and Wi-Fi® radios found in mobile devices as well as Universal Serial Bus (USB) controllers and the like.

UIC 204 is an example of UIC 104 of FIG. 1. In some examples, UIC 204 of computing device 202 may include functionality of input devices 242 and/or output devices 246. In the example of FIG. 2, UIC 204 may be or may include a presence-sensitive input device, such as a presence-sensitive display (e.g., a touchscreen). In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, a presence sensitive input device also provides output to a user using tactile, audio, or video stimuli as described with respect to one or more output devices 246, e.g., at a display. In the example of FIG. 2, UIC 204 may present a user interface.

While illustrated as an internal component of computing device 202, UIC 204 also represents an external component that shares a data path with computing device 202 for transmitting and/or receiving input and output. For instance, in one example, UIC 204 represents a built-in component of computing device 202 located within and physically connected to the external packaging of computing device 202 (e.g., a screen on a mobile phone). In another example, UIC 204 represents an external component of computing device 202 located outside and physically separated from the packaging of computing device 202 (e.g., a monitor, a projector, etc. that shares a wired and/or wireless data path with a tablet computer).

One or more storage devices 248 within computing device 202 may store information for processing during operation of computing device 202. In some examples, storage device 248 is a temporary memory, meaning that a primary purpose of storage device 248 is not long-term storage. Storage devices 248 on computing device 202 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 may be configured to store larger amounts of information than volatile memory. Storage devices 248 may further be configured for long-term storage of information as non-volatile memory space and retain information after activate/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or data associated with operating system 226, UI module 206, remote management module 208, and device management module 224.

In accordance with techniques of the disclosure, one or more processors 240 of computing device 202 are configured to execute remote management module 208 to send, to computing devices signed into the same user account as computing device 202, such as computing device 120 shown in FIG. 1, requests to perform management actions.

The management actions that computing device 202 may request other computing devices to perform may include application management actions to manage one or more applications, such as installing and/or uninstalling one or more applications, downloading and installing updates to one or more applications, opening one or more applications, and automatically archiving unused applications. The management actions may also include device management actions to manage one or more device settings at one or more of the other computing devices, such as by changing one or more device settings.

One or more processors 240 are configured to execute remote management module 208 to communicate, via one or more communication units 244 and over network 130, with a computing system, such as computing system 150 shown in FIG. 1. Remote management module 208 may receive, from computing system 150, information associated with other computing devices, such as computing device 120, that are signed into the same user account as computing device 202. The information associated with other computing devices that are signed into the same user account as computing device 202 may include indications of the computing devices signed into the same user account as computing device 102. The information may also, for each of the other computing devices signed into the same user account as computing device 102, include indications of the applications installed at the computing devices and metadata about each application installed at the computing device (e.g., the version of the application, the size of the application, whether updates are available for the application, the last time the application was opened at the computing device, etc.). The information may also, for each of the other computing devices signed into the same user account as computing device 202, include indications of device information of the computing device. Such device information of a computing device may include the amount of available storage space at the computing device, system settings and/or device settings of the computing device, information regarding any issues detected at the computing device, and the like.

One or more processors 240 are configured to execute remote management module 208 to determine a management action to be performed by computing device 120 to manage one or more applications installed at computing device 120. For example, remote management module 208 may cause UIC 204 to present a device management interface that enables a user of computing device 202 to manage application settings and/or device settings of other computing devices, such as computing device 120, signed into the same user account as computing device 202. A user of computing device 202 may interact with the device management interface to select management actions to be taken by one or more other computing devices signed into the same user account as computing device 202, and computing device 202 may send, to the one or more other computing devices, requests to perform the selected management actions.

In some examples, remote management module 208 may provide an Application Programming Interface (API). The API may provide functions that other software executing at computing device 202 may call to select management actions that remote management module 208 may request to be performed by other computing devices.

One or more processors 240 are configured to execute remote management module 208 to generate a request to perform a management action that is to be sent to computing device 120. For example, remote management module 208 may generate a request to perform the management action selected by the user of computing device 202 interacting with the device management interface or may generate a request to perform the management actions indicated by software applications using the provided API.

Remote management module 208 may generate the request to include an indication of the management action to be performed, such as by including, in the request, one or more commands to be executed or otherwise performed by computing device 120. Remote management module 208 may also generate the request to include metadata associated with the management action. For example, the metadata may indicate one or more applications on which the management action is to be performed, such as by including the package names of the one or more applications.

Remote management module 208 may also generate the request to include, information that may enable computing device 120 to authenticate the request as being sent by a computing device signed into the same user account as computing device 120 and to verify the request as being intended for computing device 120. In some examples, remote management module 208 may generate the request to include an indication of the computing device sending the request, such as by including a device identifier associated with computing device 102, and an indication of the computing device that is the intended recipient of the request, such as by including a device identifier associated with computing device 120.

In some examples, remote management module 208 may encrypt or digitally sign the request using a cryptographic key that is shared by devices (e.g., computing devices 102 and 120) signed into the same user account. Computing device 120 may therefore be able to use the shared cryptographic key to authenticate the request as being sent by a computing device signed into the same user account as computing device 120 and to verify the request as being intended for computing device 120

One or more processors 240 are configured to execute remote management module 208 to send, via one or more communication units 244 and to computing device 120, a request to perform the management action. In some examples, remote management module 208 may send the request to computing device 120 via network 130. For example, remote management module 208 may send the request via network 130 to computing system 150, and computing system 150 may in turn forward the request via network 130 to computing device 120. In some examples, remote management module 208 may use one or more communication units 244 to establish a short range wireless connection, such as short range wireless connection 118 shown in FIG. 1, with the computing device 120, and may send the request to computing device 120 via the short range wireless connection. Examples of the short range wireless connection include a Bluetooth® connection, a Bluetooth® Low Energy (BLE) connection, a Wi-Fi® Direct connection, an ultra wideband (UWB) connection, a near-field communication (NFC) connection, and the like.

In some examples, one or more processors 240 are configured to execute remote management module 208 to send the request to perform the management action to computing device 120 via network 130 regardless of whether computing device 120 is online. Computing device 120 is online when computing device 120 is able to connect to computing system 150 via network 130. Similarly, computing device 120 is offline when computing device 120 is not able to connect to computing system 150 via network 130. For example, computing device 120 may be offline when computing device 120 is turned off or when computing device 120 has turned off hardware, such as one or more W-Fi radios, for connecting to network 130.

If computing device 120 is online, remote management module 208 may send the request to computing system 150 via network 130, and computing system 150 may forward the request to computing device 120 via network 130. If computing device 120 is offline, remote management module 208 may send the request to computing system 150 via network 130, and computing system 150 may wait for computing device 120 to be online and may forward the request to computing device 120 via network 130 when network 130 is online.

In some examples, one or more processors 240 are configured to execute remote management module 208 to attempt to establish a short range wireless connection with computing device 120. If computing device 202 is able to establish a short range wireless connection with computing device 120, remote management module 208 may use one or more communication units 244 to send the request to perform the management action to computing device 120 via the short range wireless connection. If computing device 202 is not able to establish a short range wireless connection with computing device 120, such as when computing device 120 is not nearby computing device 202, remote management module 208 may use one or more communication units 244 to send the request to perform the management action to computing device 120 via network 130, such as by sending the request to computing system 150 for forwarding to computing devices 120.

In some examples, one or more processors 240 may execute remote management module 208 may select a communication channel for sending the request to perform the management action to computing device 120 based on the state of computing device 120. The state of computing device 120 may include the online status of computing device 120, such as whether computing device 120 is online or offline, and/or whether computing device 120 is powered on.

One or more processors 240 are execute remote management module 208 to determine the online status of computing device 120. For example, remote management module 208 may use one or more communication units 244 to send, to computing system 150 via network 130, a query regarding whether computing device 120 is online, and computing system 150 may, in response to receiving the query, determine whether computing device 120 is online, such as by determining whether computing devices 120 is reachable by computing system 150 via network 130 and/or whether computing devices 120 is connected to computing system 150. Computing system 150 may therefore send, to computing device 202 via network 130 a response indicating whether computing device 120 is online.

One or more processors 240 are configured to execute remote management module 208 to use one or more communication units 244 to receive, from computing system 150 via network 130, the response indicating whether computing devices 120 is online and to determine, based on the response, whether computing device 120 is online. If remote management module 208 determines that computing device 120 is online, remote management module 208 may use one or more communication units 244 to send the request to perform the management action to computing device 120 via network 130.

If remote management module 208 determines that computing device 120 is offline, remote management module 208 may attempt to use one or more communication units 244 to establish a short range wireless connection with computing device 120. If remote management module 208 is able to establish a short range wireless connection with computing device 120, remote management module 208 may use one or more communication units 244 to send the request to perform the management action to computing device 120 via the short range wireless connection. If remote management module 208 is not able to establish a short range wireless connection with computing device 120, remote management module 208 may use one or more communication units 244 to send the request to perform the management action to computing device 120 via network 130

One or more processors 240 are therefore configured to execute remote management module 208 to select a communication channel for sending the request to perform the management action to computing device 120 and to send, using one or more communication units 244, the request to computing device 120 via the selected communication channel. Computing device 120 may receive the request to perform the management action and may, in response to receiving the request, perform the management action indicated by the request.

In some examples, one or more processors 240 are configured to execute device management module 224 to receive, via one or more communication units 244, a request to perform a management action. The request to perform a management action may be sent by a computing device that is signed into the same user account as computing device 202 and may be sent via a short range wireless connection, such as short range wireless connection 118, to computing device 202 or may be sent by a computing system, such as computing system 150, via network 130. Device management module 224 may, in response to receiving the request to perform the management action, authenticate the request as being sent by a computing device signed into the same user account as computing device 202 and to verify the request as being intended for computing device 202. If the request includes an indication of the sender of the request, such as a device identifier associated with the sender of the, device management module 224 may determine whether the device identifier associated with the sender of the request matches a device identifier of a computing device signed into the user account to authenticate the request as being sent by a computing device signed into the same user account as computing device 202. Similarly, if the request includes an indication of the intended recipient of the request, such as a device identifier associated with the recipient of the request, device management module 224 may determine whether the device identifier associated with the recipient of the request matches the device identifier of computing device 202 to verify the request as being intended for computing device 202.

In some examples, if the request is encrypted or digitally signed using a cryptographic key that is shared by devices (e.g., computing devices 102 and 120) signed into the same user account, device management module 224 may use the shared cryptographic key to authenticate the request as being sent by a computing device signed into the same user account as computing device 202 and to verify the request as being intended for computing device 202, such as by decrypting the request using the shared cryptographic key or by using the shared cryptographic key to verify the digital signature.

One or more processors 240 may execute device management module 224 to, in response to successfully authenticating the request as being sent by a computing device signed into the same user account as computing device 202 and in response to successfully verifying the request as being intended for computing device 202, perform the requested management action. For example, if the requested management action is installing a given application at computing device 202, device management module 224 may perform the requested management action by communicating with computing system 150 to download the given application may install the downloaded application.

In another example, if the requested management action is turning on an auto archive setting at computing device 202 to automatically archiving applications installed at computing device 202 that have be unused for a specified amount of time, device management module 224 may perform the management action to turn on the auto archive setting at computing device 202. Device management module 224 may therefore, for applications installed at computing device 202, monitor the last time the applications were opened, and may automatically archive any applications that have not been opened for a specified amount of time, such as the last 30 days. Device management module 224 may archive such applications by deleting data associated with such applications from computing device 224, thereby freeing up storage space at computing device 224.

FIGS. 3A-3G are conceptual diagrams illustrating example user interfaces for remotely managing computing devices, in accordance with aspects of this disclosure. For purposes of illustration only, FIGS. 3A-3G are described herein within the context of environment 100 of FIG. 1 and computing device 202 of FIG. 2.

Computing device 202 may execute remote management module 208 to act as a digital hub to enable a user to manage multiple different remote computing devices of the user that are all signed into the same user account associated with the user. Remote management module 208 may provide user interfaces that provide glanceable information regarding remote computing devices and that contextually highlight key tasks and actions that computing device 202 may request to be performed by remote computing devices (e.g., computing device 120). The user interfaces provided by remote management module 208 may also, when appropriate, drive the user to opt into requests for remote computing devices to enable automated actions that may improve the performance of those remote computing devices.

Figure 3A:
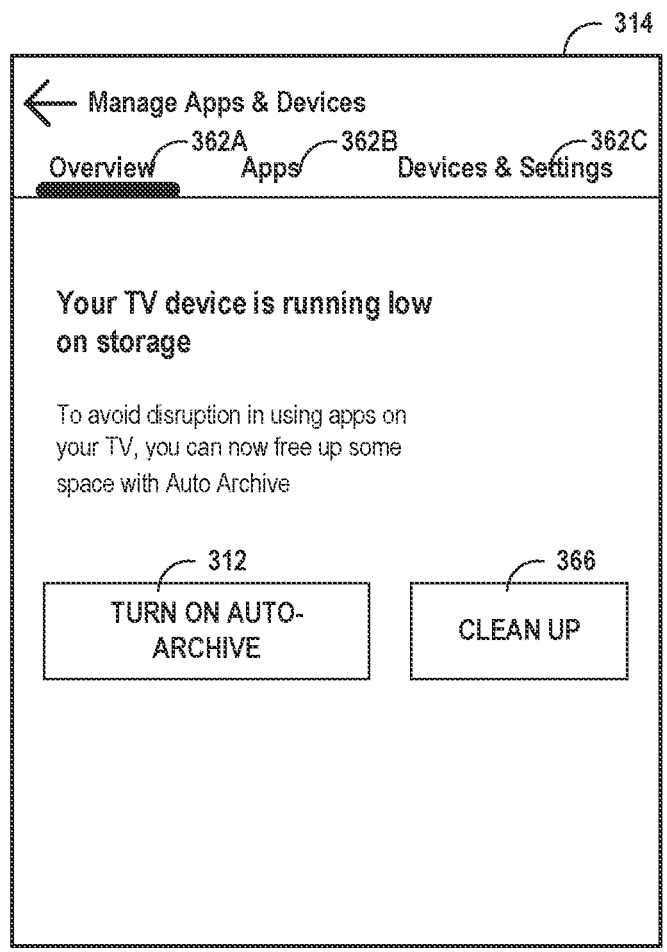
FIGS. 3A-3G are conceptual diagrams illustrating example user interfaces for remotely managing computing devices, in accordance with aspects of this disclosure.

As shown in FIG. 3A, computing device 202 may execute remote management module 208 to display, at UIC 204, user interface 314A. User interface 314A may have overview tab 362A, apps tab 362B, and devices and settings tab 362C. When overview tab 362A is selected, user interface 314A may present an overview of information and/or statuses of one or more remote computing devices, such as computing device 120. In the example of FIG. 3A, computing device 120 is an OTT device connected to a television, and user interface 314A may present information regarding the OTT device, such as that the OTT device is running low on storage space. User interface 314A may therefore include auto-archive button 312 that a user may select to cause computing device 202 to send, to computing device 120, a request to turn on auto-archiving of unused applications. User interface 314A may therefore also include clean up button 366 that a user may select to cause computing device 202 to send, to computing device 120, a request to perform clean up of computing device 120's storage space, such as deleting temporary data from computing device 120's storage space.

Figure 3B:
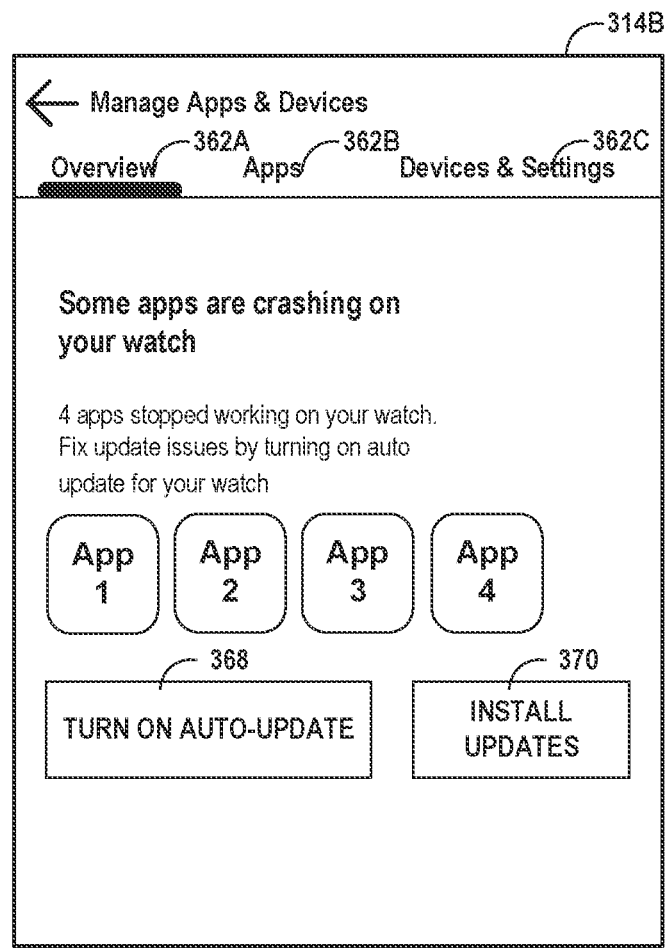

As shown in FIG. 3B, computing device 202 may execute remote management module 208 to display, at UIC 204, user interface 314B having overview tab 362A, apps tab 362B, and devices and settings tab 362C. In the example of FIG. 3B, computing device 120 may be a smartwatch, and when overview tab 362A is selected, user interface 314B may present an overview of information and/or statuses of computing device 120, such as that certain applications of the smartwatch have stopped working. User interface 314B may therefore include auto-update button 368 that a user may select to cause computing device 202 to send, to computing device 120, a request to turn on auto-updating of applications at computing device 120. User interface 314B may therefore also include install updates button 370 that a user may select to cause computing device 202 to send, to computing device 120, a request to install updates of the applications indicated in user interface 314B as having stopped working.

Figure 3C:
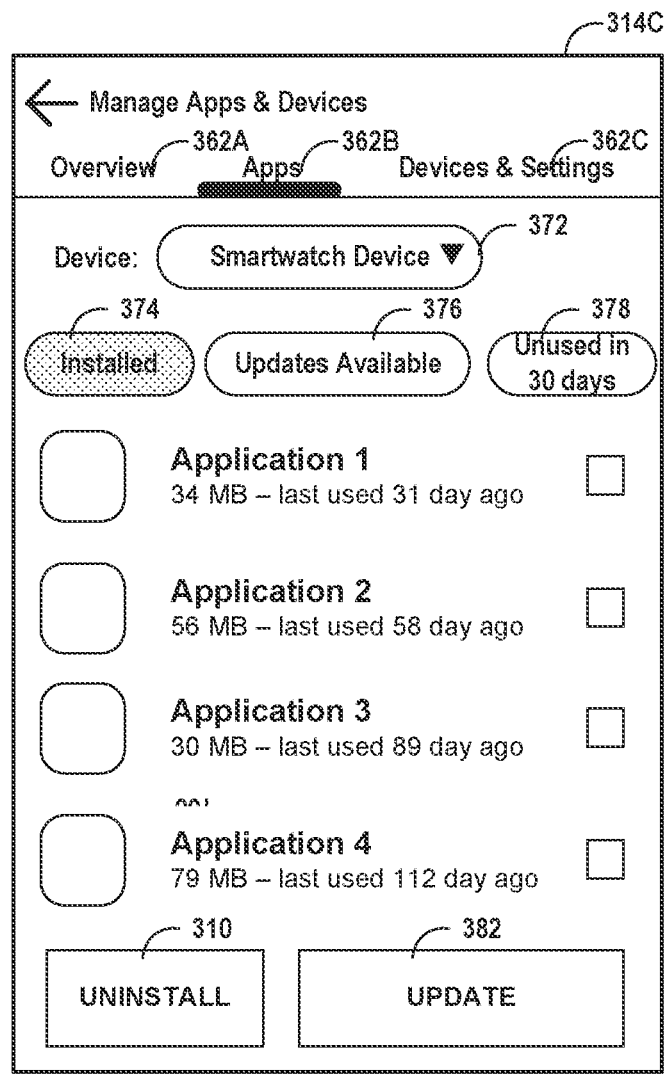

As shown in FIG. 3C, computing device 202 may execute remote management module 208 to display, at UIC 204, user interface 314C having overview tab 362A, apps tab 362B, and devices and settings tab 362C. In the example of FIG. 3C, apps tab 362B is selected, and user interface 314C may present management actions that computing device 202 may request to be performed by remote computing devices on applications.

When apps tab 362B is selected, user interface 314C may present device selection control 372, which may enable a user to select a remote computing device (e.g., computing device 120) out of a plurality of remote computing devices that may each be signed into the same user account as computing device 102. In the example of FIG. 3C, computing device 120, which is a smartwatch, is selected, and apps tab 362B may present details of applications installed at the selected remote computing device.

Tab 362B may have an installed section 374, updates available section 376, and unused applications section 378. In the example of FIG. 3C, installed section 374 is selected, and tab 362B of user interface 314C may present a list of applications installed at the selected remote computing device. A user may interact with user interface 314C to select one or more of the applications installed at the remote computing device that is listed in user interface 314C and may select uninstall button 310 to cause computing device 202 to send, to the remote computing device, a request to uninstall the selected one or more applications. Similarly, a user may interact with user interface 314C to select one or more of the applications installed at the remote computing device that is listed in user interface 314C and may select update button 382 to cause computing device 202 to send, to the remote computing device, a request to install updates for the selected one or more applications.

Figure 3D:
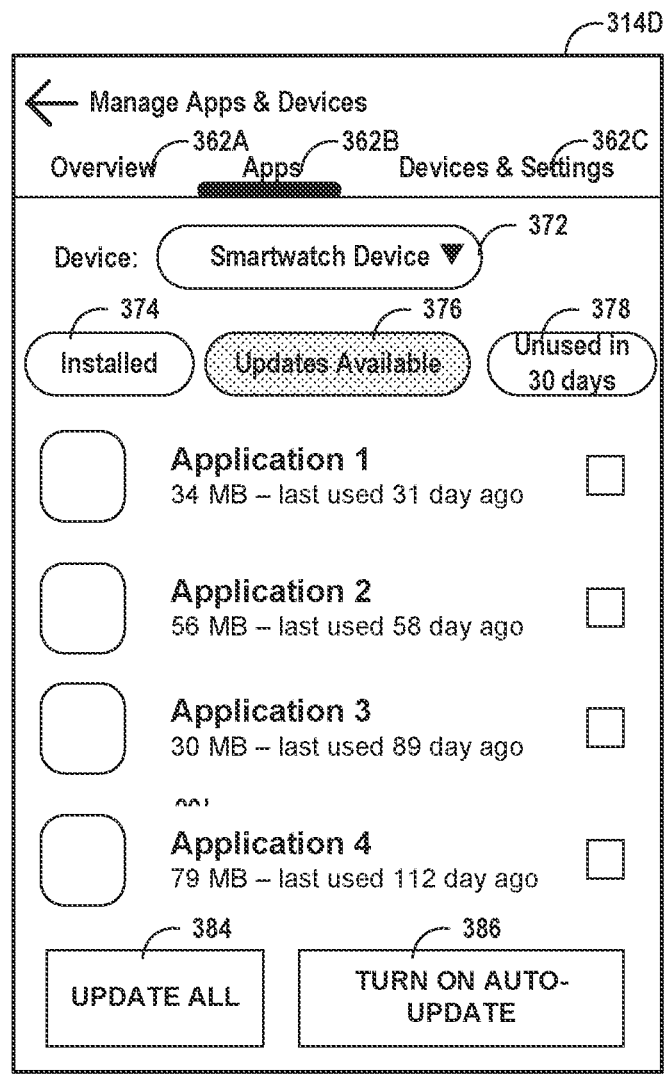

As shown in FIG. 3D, computing device 202 may execute remote management module 208 to display, at UIC 204, user interface 314D having overview tab 362A, apps tab 362B, and devices and settings tab 362C. In the example of FIG. 3D, apps tab 362B is selected, and user interface 314C may present management actions that computing device 202 may request to be performed by remote computing devices on applications.

When apps tab 362B is selected, user interface 314D may present device selection control 372, which may enable a user to select a remote computing device (e.g., computing device 120) out of a plurality of remote computing devices that may each be signed into the same user account as computing device 102. In the example of FIG. 3D, computing device 120, which is a smartwatch, is selected, and apps tab 362B may present details of applications installed at the selected remote computing device.

Tab 362B may have an installed section 374, updates available section 376, and unused applications section 378. In the example of FIG. 3D, updates available section 376 is selected, and tab 362B of user interface 314D may present a list of applications installed at the selected remote computing device that have available updates. A user may interact with user interface 314D to select update all button 384 to cause computing device 202 to send, to the remote computing device, a request to install updates for all applications installed at the remote computing device having available updates. Similarly, a user may interact with user interface 314D to select auto-update button 386 to cause computing device 202 to send, to the remote computing device, a request to turn on auto-updating for applications installed at the remote computing device.

Figure 3E:
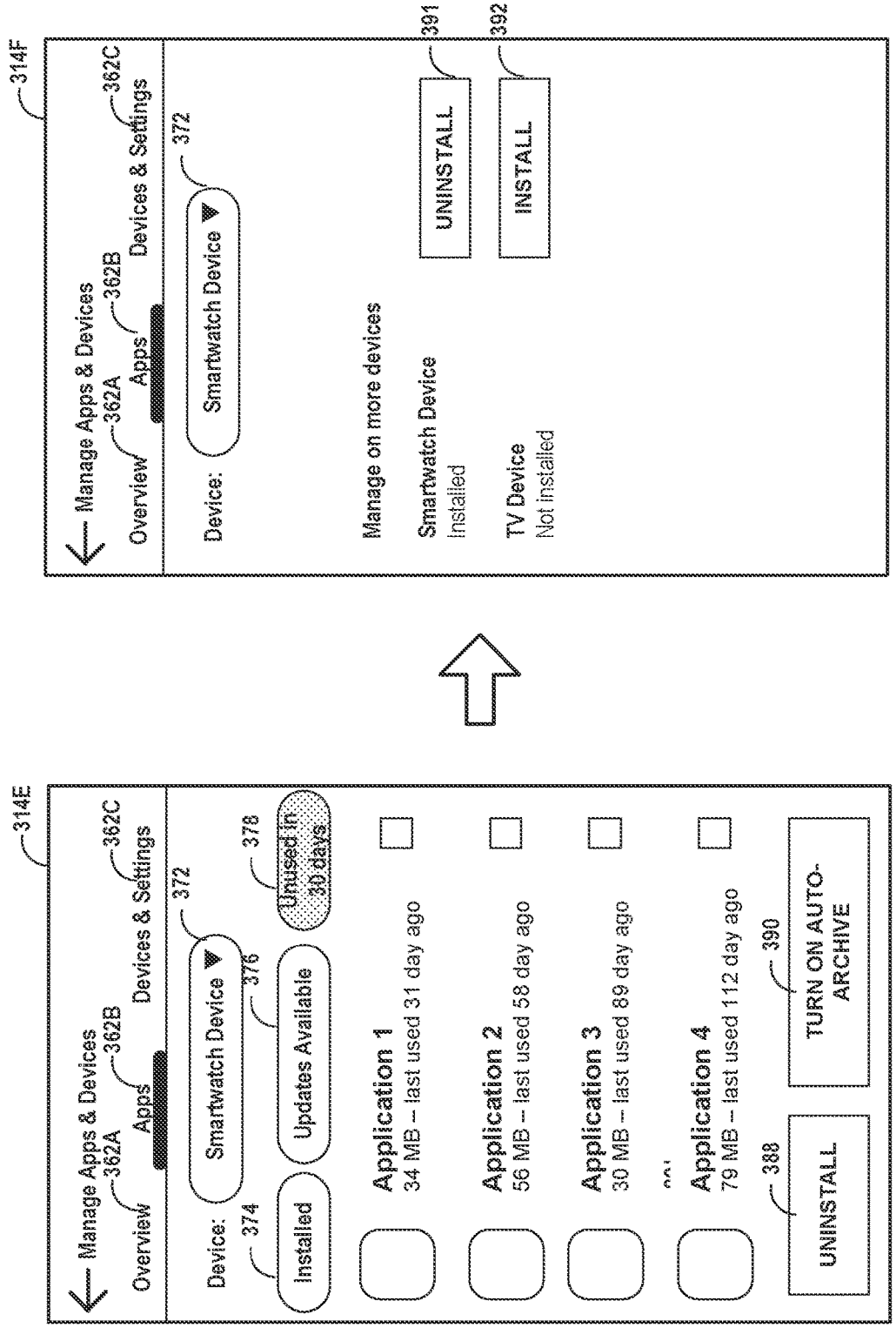

As shown in FIG. 3E, computing device 202 may execute remote management module 208 to display, at UIC 204, user interface 314E having overview tab 362A, apps tab 362B, and devices and settings tab 362C. In the example of FIG. 3E, apps tab 362B is selected, and user interface 314E may present management actions that computing device 202 may request to be performed by remote computing devices on applications.

When apps tab 362B is selected, user interface 314E may present device selection control 372, which may enable a user to select a remote computing device (e.g., computing device 120) out of a plurality of remote computing devices that may each be signed into the same user account as computing device 102. In the example of FIG. 3E, computing device 120, which is a smartwatch, is selected, and apps tab 362B may present details of applications installed at the selected remote computing device.

Tab 362B may have an installed section 374, updates available section 376, and unused applications section 378. In the example of FIG. 3E, unused applications section 378 is selected, and tab 362B of user interface 314E may present a list of applications installed at the selected remote computing device that have not been opened in the last 30 days. A user may interact with user interface 314E to select one or more of the applications installed at the remote computing device that is listed in user interface 314E and may select uninstall button 388 to cause computing device 202 to send, to the remote computing device, a request to uninstall the selected one or more applications. Similarly, a user may interact with user interface 314E to select auto-archive button 390 to cause computing device 202 to send, to the remote computing device, a request to turn on auto-archiving of unused applications installed at the remote computing device.

In some examples, remote management module 208 may allow a user to manage an application across multiple remote computing devices signed into the same user account. For example, if a user interacts with user interface 314E to select an application listed in user interface 314E, remote management module 208 may display, at UIC 204, user interface 314F that presents information regarding whether the selected application is installed at each of a plurality of remote computing devices signed into the same user account. For example, user interface 314F may indicate that the selected application is installed at a smartwatch but is not installed at an OTT device. User interface 314F may therefore include uninstall button 391 that the user may select to cause computing device 202 to send, to the smartwatch, a request to uninstall the application and may also include install button 392 that the user may select to cause computing device 202 to send, to the OTT device, a request to install the application.

Figure 3F:
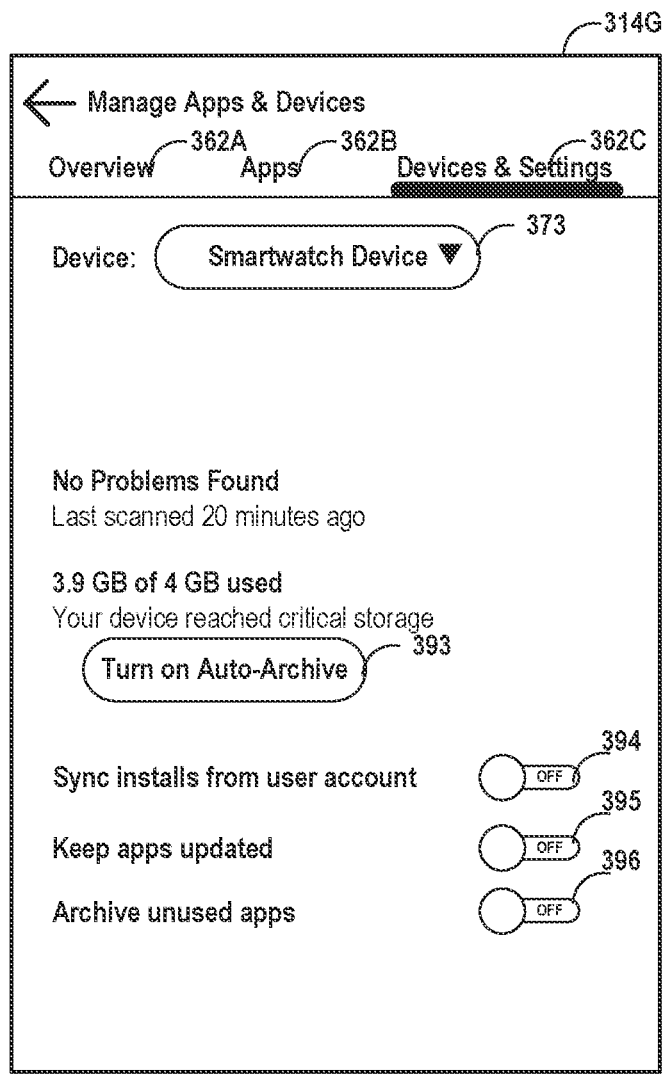

As shown in FIG. 3F, computing device 202 may execute remote management module 208 to display, at UIC 204, user interface 314G having overview tab 362A, apps tab 362B, and devices and settings tab 362C. In the example of FIG. 3F, device and settings tab 362C is selected, and user interface 314G may present device settings of remote devices that are signed into the same user account as computing device 202.

When device and settings tab 362C is selected, user interface 314G may present device selection control 373, which may enable a user to select a remote computing device (e.g., computing device 120) out of a plurality of remote computing devices that may each be signed into the same user account as computing device 102. In the example of FIG. 3F, computing device 120, which is a smartwatch, is selected, and device and settings tab 362C may present details of the selected remote computing device.

For example, device and settings tab 362C may present, for the selected remote computing device, information regarding any problems found at the remote computing device. Device and settings tab 362C may also present the amount of storage space used at the remote computing device and, if the amount of unused storage space is too low, device and settings tab 362C may include auto-archive button 393 that a user may select to cause computing device 202 to send a request to the selected remote computing device to auto-archive unused applications to free up storage space at the remote computing device.

Device and settings tab 362C may also include additional user interface elements that a user may select to modify settings at the remote computing device. For example, device and settings tab 362C may include toggle control 394 that a user may select to cause computing device 202 to send a request to the selected remote computing device to sync application installs across all of the remote computing devices signed into the same user account, toggle control 395 that a user may select to cause computing device 202 to send a request to the selected remote computing device to turn on auto-updating of applications, and toggle control 396 that a user may select to cause computing device 202 to send a request to the selected remote computing device to turn on auto-archiving of unused applications.

Figure 3G:
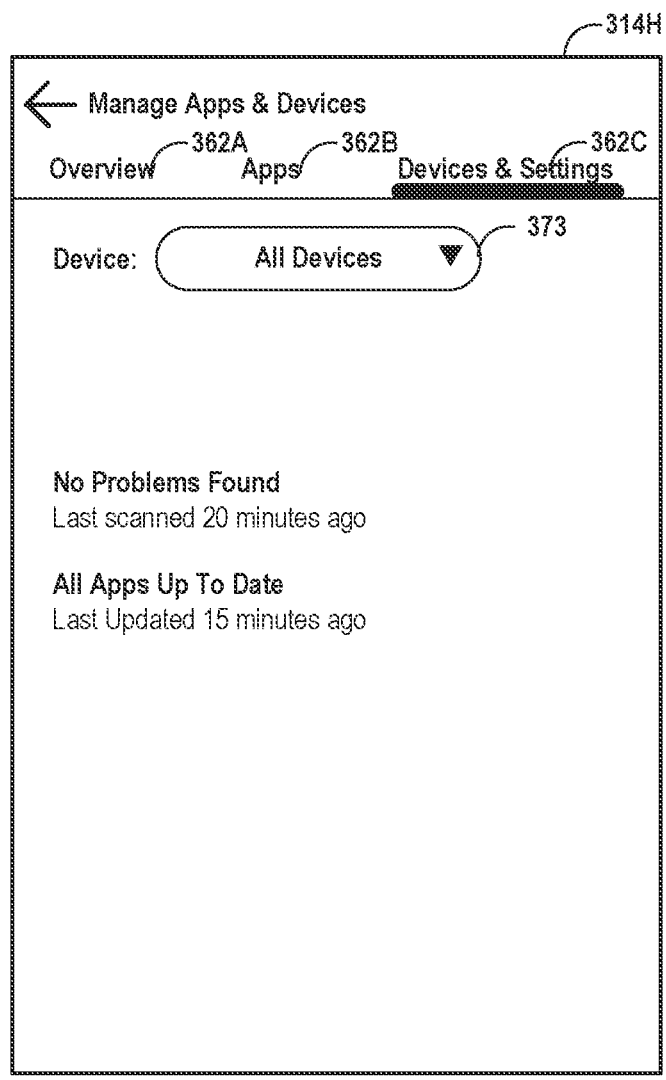

As shown in FIG. 3G, computing device 202 may execute remote management module 208 to display, at UIC 204, user interface 314H having overview tab 362A, apps tab 362B, and devices and settings tab 362C. In the example of FIG. 3G, device and settings tab 362C is selected, and user interface 314H may present device settings of remote devices that are signed into the same user account as computing device 202.

When device and settings tab 362C is selected, user interface 314H may present device selection control 373, which may enable a user to select a remote computing device (e.g., computing device 120) out of a plurality of remote computing devices that may each be signed into the same user account as computing device 102. In the example of FIG. 3G, the user may interact with device selection control 373 to select all of the remote computing devices that are signed into the same user account as computing device 102. Device and settings tab 362C may therefore present information regarding all of the remote computing devices that are signed into the same user account, such as whether any problems were found in any of the remote computing devices and whether applications installed at each of the remote computing devices are up to date.

Figure 4:
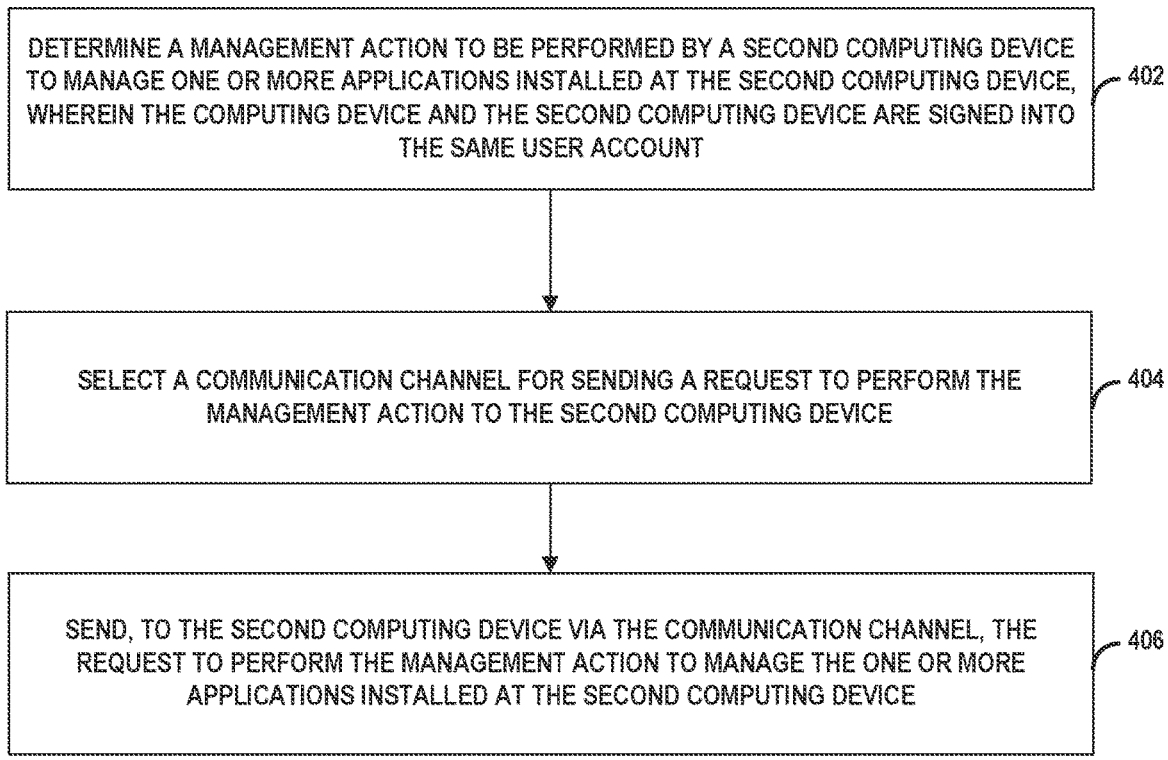
FIG. 4 is a flowchart illustrating an example mode of operation for a computing device to perform remote application management, in accordance with one or more techniques of the present disclosure.

FIG. 4 is a flowchart illustrating an example mode of operation for a computing device to perform remote application management, in accordance with one or more techniques of the present disclosure. FIG. 4 is described below in the context of FIGS. 1-3.

As shown in FIG. 4, one or more processors 240 of computing device 202 may determine a management action to be performed by a second computing device 120 to manage one or more applications installed at the second computing device 120, wherein the computing device 202 and the second computing device 120 are signed into the same user account (402).

In some examples, the management action includes uninstalling the one or more applications that are installed at the second computing device 120. In some examples, the management action includes turning on an auto archive setting at the second computing device 120 to automatically archiving applications installed at the second computing device 120 that have be unused for a specified amount of time. In some examples, the management action includes updating the one or more applications installed at the second computing device 120. In some examples, the management action includes turning on an auto update setting at the second computing device 120 to automatically update applications installed at the second computing device 120 that have available updates.

One or more processors 240 may select a communication channel for sending a request to perform the management action to the second computing device (404). In some examples, to select the communication channel for sending the request to perform the management action to the second computing device 120, the one or more processors 240 may select one of a direct wireless connection 118 between the computing device 202 and the second computing device 120 or a public network as the communication channel for sending the request to perform the management action to the second computing device 120.

In some examples, to select one of the direct wireless connection 118 between the computing device 202 and the second computing device 120 or a public network as the communication channel for sending the request to perform the management action to the second computing device 120, the one or more processors 240 may determine that the computing device 202 is able to establish the direct wireless connection 118 between the computing device 202 and the second computing device 120. One or more processors 240 may, in response to determining that the computing device 202 is able to establish the direct wireless connection 118 between the computing device 202 and the second computing device 120, select the direct wireless connection 118 between the computing device 202 and the second computing device 120 as the communication channel for sending the request to perform the management action to the second computing device 120.

In some examples, to select one of the direct wireless connection 118 between the computing device 202 and the second computing device 120 or the public network as the communication channel for sending the request to perform the management action to the second computing device 120, the one or more processors 240 may determine an online status of the second computing device 120 and may select, based on the online status of the second computing device 120, one of the direct wireless connection 118 between the computing device 202 and the second computing device 120 or the public network as the communication channel for sending the request to perform the management action to the second computing device 120.

One or more processors 240 may send, to the second computing device 120 via the communication channel, the request to perform the management action to manage the one or more applications installed at the second computing device 120 (406). In some examples, to send to the second computing device 120 via the communication channel, the request to perform the management action to manage the one or more applications installed at the second computing device 120, one or more processors 240 may send, via the communication channel, the request to perform the management action to a computing system 150 for forwarding to the second computing device 120.

Figure 5:
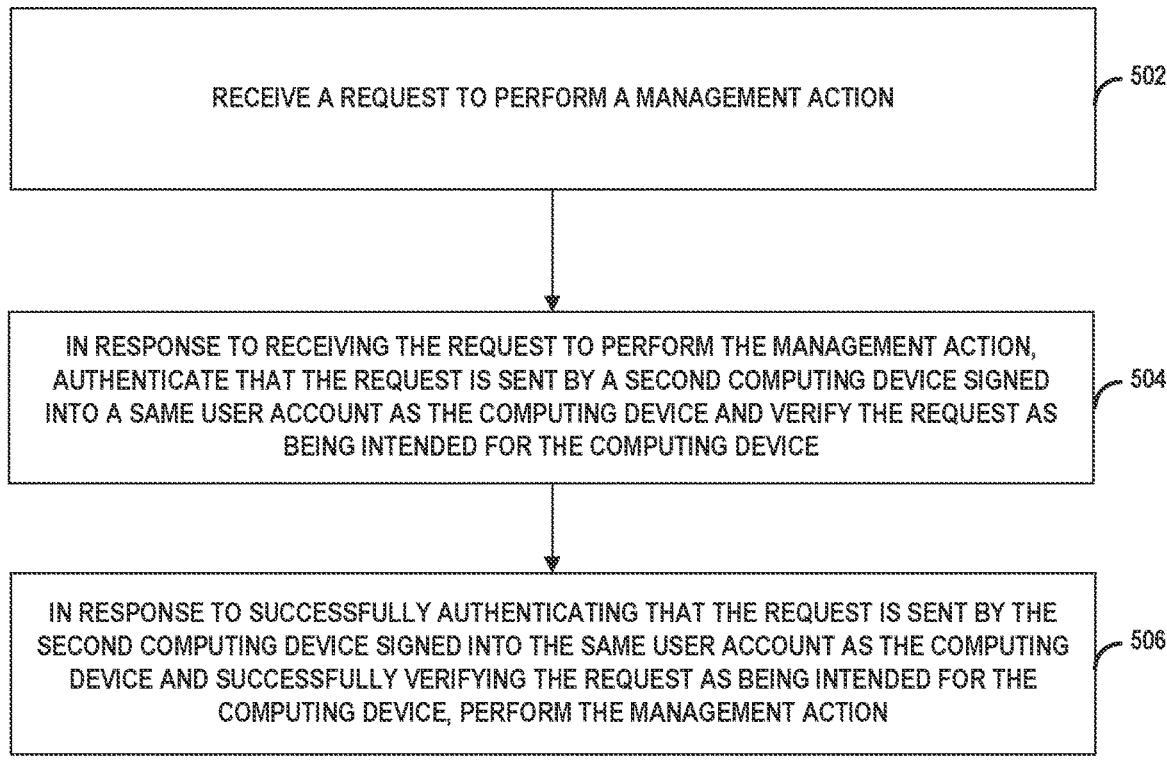
FIG. 5 is a flowchart illustrating an example mode of operation for a computing device to perform management actions requested by a remote computing device, in accordance with one or more techniques of the present disclosure.

FIG. 5 is a flowchart illustrating an example mode of operation for a computing device to perform management actions requested by a remote computing device, in accordance with one or more techniques of the present disclosure. FIG. 5 is described below in the context of FIGS. 1-3.

As shown in FIG. 5, one or more processors 240 of computing device 202 may receive a request to perform a management action (502). In some examples, management action includes uninstalling the one or more applications that are installed at the computing device. In some examples, the management action includes turning on an auto archive setting at the computing device 202 to automatically archiving applications installed at the computing device 202 that have be unused for a specified amount of time. In some examples, the management action includes updating the one or more applications installed at the computing device 202. In some examples, the management action includes updating the one or more applications installed at the computing device 202. In some examples, the management action includes turning on an auto update setting at the computing device 202 to automatically update applications installed at the computing device 202 that have available updates.

One or more processors 240 may, in response to receiving the request to perform the management action, authenticate that the request is sent by a second computing device signed into a same user account as the computing device 202 and verify the request as being intended for the computing device 202 (504). One or more processors 240 may, in response to successfully authenticating that the request is sent by the second computing device signed into the same user account as the computing device 202 and successfully verifying the request as being intended for the computing device 202, perform the management action (506).

This disclosure includes the following examples.

Example 1. A method comprising: determining, by one or more processors of a first computing device signed into a user account, a management action to be performed by a second computing device signed into the user account to manage one or more applications installed at the second computing device; selecting, by the one or more processors, a communication channel for sending a request to perform the management action to the second computing device; and sending, by the one or more processors and to the second computing device via the communication channel, the request to perform the management action to manage the one or more applications installed at the second computing device.

Example 2. The method of example 1, wherein the management action includes uninstalling the one or more applications that are installed at the second computing device.

Example 3. The method of any of examples 1 and 2, wherein the management action includes turning on an auto archive setting at the second computing device to automatically archiving applications installed at the second computing device that have be unused for a specified amount of time.

Example 4. The method of any of examples 1-3, wherein the management action includes updating the one or more applications installed at the second computing device.

Example 5. The method of any of examples 1-4, wherein the management action includes turning on an auto update setting at the second computing device to automatically update applications installed at the second computing device that have available updates.

Example 6. The method of any of examples 1-5, wherein selecting the communication channel for sending the request to perform the management action to the second computing device further comprises: selecting one of a direct wireless connection between the first computing device and the second computing device or a public network as the communication channel for sending the request to perform the management action to the second computing device.

Example 7. The method of example 6, wherein selecting one of the direct wireless connection between the first computing device and the second computing device or the public network as the communication channel for sending the request to perform the management action to the second computing device further comprises: determining, by the one or more processors, that the first computing device is able to establish the direct wireless connection between the first computing device and the second computing device; and in response to determining that the first computing device is able to establish the direct wireless connection between the first computing device and the second computing device, selecting, by the one or more processors, the direct wireless connection between the first computing device and the second computing device as the communication channel for sending the request to perform the management action to the second computing device.

Example 8. The method of example 6, wherein selecting one of the direct wireless connection between the first computing device and the second computing device or the public network as the communication channel for sending the request to perform the management action to the second computing device further comprises: determining, by the one or more processors, an online status of the second computing device; and selecting, by the one or more processors and based on the online status of the second computing device, one of the direct wireless connection between the first computing device and the second computing device or the public network as the communication channel for sending the request to perform the management action to the second computing device.

Example 9. The method of any of examples 1-8, wherein sending, to the second computing device via the communication channel, the request to perform the management action to manage the one or more applications installed at the second computing device further comprises: sending, by the one or more processors and via the communication channel, the request to perform the management action to a computing system for forwarding to the second computing device.

Example 10. A computing device comprising: a memory that stores instructions; and one or more processors that execute the instructions to: determine a management action to be performed by a second computing device to manage one or more applications installed at the second computing device, wherein the computing device and the second computing device are signed into the same user account; select a communication channel for sending a request to perform the management action to the second computing device; and send, to the second computing device via the communication channel, the request to perform the management action to manage the one or more applications installed at the second computing device.

Example 11. The computing device of example 10, wherein the management action includes uninstalling the one or more applications that are installed at the second computing device.

Example 12. The computing device of any of examples 10 and 11, wherein the management action includes turning on an auto archive setting at the second computing device to automatically archiving applications installed at the second computing device that have be unused for a specified amount of time.

Example 13. The computing device of any of examples 10-12, wherein the management action includes updating the one or more applications installed at the second computing device.

Example 14. The computing device of any of examples 10-13, wherein the management action includes turning on an auto update setting at the second computing device to automatically update applications installed at the second computing device that have available updates.

Example 15. The computing device of any of examples 10-14, wherein to select the communication channel for sending the request to perform the management action to the second computing device, the one or more processors are further configured to: select one of: a direct wireless connection between the computing device and the second computing device or a public network as the communication channel for sending the request to perform the management action to the second computing device.

Example 16. The computing device of example 15, wherein to select one of the direct wireless connection between the computing device and the second computing device or a public network as the communication channel for sending the request to perform the management action to the second computing device, the one or more processors are further configured to: determine that the computing device is able to establish the direct wireless connection between the computing device and the second computing device; and in response to determining that the computing device is able to establish the direct wireless connection between the computing device and the second computing device, select the direct wireless connection between the computing device and the second computing device as the communication channel for sending the request to perform the management action to the second computing device.

Example 17. The computing device of example 15, wherein to select one of the direct wireless connection between the computing device and the second computing device or the public network as the communication channel for sending the request to perform the management action to the second computing device, the one or more processors are further configured to: determine an online status of the second computing device; and select, based on the online status of the second computing device, one of the direct wireless connection between the computing device and the second computing device or the public network as the communication channel for sending the request to perform the management action to the second computing device.

Example 18. The computing device of any of examples 10-17, wherein to send, to the second computing device via the communication channel, the request to perform the management action to manage the one or more applications installed at the second computing device, the one or more processors are further configured to: send, via the communication channel, the request to perform the management action to a computing system for forwarding to the second computing device.

Example 19. A computer-readable storage medium storing instructions that, when executed, cause one or more processors of a computing device to: determine a management action to be performed by a second computing device to manage one or more applications installed at the second computing device, wherein the computing device and the second computing device are signed into the same user account; select a communication channel for sending a request to perform the management action to the second computing device; and send, to the second computing device via the communication channel, the request to perform the management action to manage the one or more applications installed at the second computing device.

Example 20. The computer-readable storage medium of example 19, wherein the instructions that cause the one or more processors to select the communication channel for sending the request to perform the management action to the second computing device further cause the one or more processors to: select one of: the Internet or a direct wireless connection between the computing device and the second computing device as the communication channel for sending the request to perform the management action to the second computing device.

Example 21. A method comprising: receiving, by one or more processors of a first computing device, a request to perform a management action; in response to receiving the request to perform the management action, authenticating, by the one or more processors, that the request is sent by a second computing device signed into a same user account as the first computing device and verifying, by the one or more processors, the request as being intended for the first computing device; and in response to successfully authenticating that the request is sent by the second computing device signed into the same user account as the first computing device and successfully verifying the request as being intended for the first computing device, performing, by the one or more processors, the management action.

Example 22. The method of example 21, wherein the management action includes uninstalling the one or more applications that are installed at the first computing device.

Example 23. The method of any of examples 21 and 22, wherein the management action includes turning on an auto archive setting at the first computing device to automatically archiving applications installed at the first computing device that have be unused for a specified amount of time.

Example 24. The method of any of examples 21-23, wherein the management action includes updating the one or more applications installed at the first computing device.

Example 25. The method of any of examples 21-24, wherein the management action includes turning on an auto update setting at the computing device to automatically update applications installed at the computing device that have available updates.

Example 26. A computing device comprising: a memory that stores instructions; and one or more processors that execute the instructions to: receive a request to perform a management action; in response to receiving the request to perform the management action, authenticate that the request is sent by a second computing device signed into a same user account as the computing device and verify the request as being intended for the computing device; and in response to successfully authenticating that the request is sent by the second computing device signed into the same user account as the computing device and successfully verifying the request as being intended for the computing device, perform the management action.

Example 27. The computing device of example 26, wherein the management action includes uninstalling the one or more applications that are installed at the computing device.

Example 28. The computing device of any of examples 26 and 27, wherein the management action includes turning on an auto archive setting at the computing device to automatically archiving applications installed at the computing device that have be unused for a specified amount of time.

Example 29. The computing device of any of examples 26-28, wherein the management action includes updating the one or more applications installed at the computing device.

Example 30. The computing device of any of examples 26-29, wherein the management action includes turning on an auto update setting at the computing device to automatically update applications installed at the computing device that have available updates.

Example 31. A computer-readable storage medium storing instructions that, when executed, cause one or more processors of a computing device to: receive a request to perform a management action; in response to receiving the request to perform the management action, authenticate that the request is sent by a second computing device signed into a same user account as the computing device and verify the request as being intended for the computing device; and in response to successfully authenticating that the request is sent by the second computing device signed into the same user account as the computing device and successfully verifying the request as being intended for the computing device, perform the management action.

Example 32. The computer-readable storage medium of example 31, wherein the management action includes uninstalling the one or more applications that are installed at the computing device.

Example 33. The computer-readable storage medium of any of examples 31 and 32, wherein the management action includes turning on an auto archive setting at the computing device to automatically archiving applications installed at the computing device that have be unused for a specified amount of time.

Example 34. The computer-readable storage medium of any of examples 31-33, wherein the management action includes updating the one or more applications installed at the computing device.

Example 35. The computer-readable storage medium of any of examples 31-34, wherein the management action includes turning on an auto update setting at the computing device to automatically update applications installed at the computing device that have available updates.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   determining, by one or more processors of a first computing device signed into a user account, a management action to be performed by a second computing device signed into the user account to manage one or more applications installed at the second computing device, wherein the management action includes turning on an auto archive setting at the second computing device to automatically archive applications installed at the second computing device that have been unused for a specified amount of time;
   selecting, by the one or more processors, a communication channel for sending a request to perform the management action to the second computing device; and
   sending, by the one or more processors and to the second computing device via the communication channel, the request to perform the management action to manage the one or more applications installed at the second computing device.

2. The method of claim 1, wherein the management action includes uninstalling the one or more applications that are installed at the second computing device.

3. The method of claim 1, wherein the management action includes updating the one or more applications installed at the second computing device.

4. The method of claim 1, wherein the management action includes turning on an auto update setting at the second computing device to automatically update applications installed at the second computing device that have available updates.

5. The method of claim 1, wherein selecting the communication channel for sending the request to perform the management action to the second computing device further comprises:
  selecting one of a direct wireless connection between the first computing device and the second computing device or a public network as the communication channel for sending the request to perform the management action to the second computing device.

6. The method of claim 5, wherein selecting one of the direct wireless connection between the first computing device and the second computing device or the public network as the communication channel for sending the request to perform the management action to the second computing device further comprises:
  determining, by the one or more processors, that the first computing device is able to establish the direct wireless connection between the first computing device and the second computing device; and
  in response to determining that the first computing device is able to establish the direct wireless connection between the first computing device and the second computing device, selecting, by the one or more processors, the direct wireless connection between the first computing device and the second computing device as the communication channel for sending the request to perform the management action to the second computing device.

7. The method of claim 5, wherein selecting one of the direct wireless connection between the first computing device and the second computing device or the public network as the communication channel for sending the request to perform the management action to the second computing device further comprises:
  determining, by the one or more processors, an online status of the second computing device; and
  selecting, by the one or more processors and based on the online status of the second computing device, one of the direct wireless connection between the first computing device and the second computing device or the public network as the communication channel for sending the request to perform the management action to the second computing device.

8. The method of claim 1, wherein sending, to the second computing device via the communication channel, the request to perform the management action to manage the one or more applications installed at the second computing device further comprises:
  sending, by the one or more processors and via the communication channel, the request to perform the management action to a computing system for forwarding to the second computing device.

9. A computing device comprising:
  a memory that stores instructions; and
  one or more processors that execute the instructions to:
    determine a management action to be performed by a second computing device to manage one or more applications installed at the second computing device, wherein the computing device and the second computing device are signed into a same user account, wherein the management action includes turning on an auto archive setting at the second computing device to automatically archive applications installed at the second computing device that have been unused for a specified amount of time;
    select a communication channel for sending a request to perform the management action to the second computing device; and
    send, to the second computing device via the communication channel, the request to perform the management action to manage the one or more applications installed at the second computing device.

10. The computing device of claim 9, wherein the management action includes uninstalling the one or more applications that are installed at the second computing device.

11. The computing device of claim 9, wherein the management action includes updating the one or more applications installed at the second computing device.

12. The computing device of claim 9, wherein the management action includes turning on an auto update setting at the second computing device to automatically update applications installed at the second computing device that have available updates.

13. The computing device of claim 9, wherein to select the communication channel for sending the request to perform the management action to the second computing device, the one or more processors are further configured to:
  select one of: a direct wireless connection between the computing device and the second computing device or a public network as the communication channel for sending the request to perform the management action to the second computing device.

14. The computing device of claim 13, wherein to select one of the direct wireless connection between the computing device and the second computing device or a public network as the communication channel for sending the request to perform the management action to the second computing device, the one or more processors are further configured to:
  determine that the computing device is able to establish the direct wireless connection between the computing device and the second computing device; and
  in response to determining that the computing device is able to establish the direct wireless connection between the computing device and the second computing device, select the direct wireless connection between the computing device and the second computing device as the communication channel for sending the request to perform the management action to the second computing device.

15. The computing device of claim 13, wherein to select one of the direct wireless connection between the computing device and the second computing device or the public network as the communication channel for sending the request to perform the management action to the second computing device, the one or more processors are further configured to:
  determine an online status of the second computing device; and
  select, based on the online status of the second computing device, one of the direct wireless connection between the computing device and the second computing device or the public network as the communication channel for sending the request to perform the management action to the second computing device.

16. The computing device of claim 9, wherein to send, to the second computing device via the communication channel, the request to perform the management action to manage the one or more applications installed at the second computing device, the one or more processors are further configured to:

send, via the communication channel, the request to perform the management action to a computing system for forwarding to the second computing device.

17. A computer-readable storage medium storing instructions that, when executed, cause one or more processors of a computing device to:

determine a management action to be performed by a second computing device to manage one or more applications installed at the second computing device, wherein the computing device and the second computing device are signed into a same user account, wherein the management action includes turning on an auto archive setting at the second computing device to automatically archive applications installed at the second computing device that have been unused for a specified amount of time;

select a communication channel for sending a request to perform the management action to the second computing device; and send, to the second computing device via the communication channel, the request to perform the management action to manage the one or more applications installed at the second computing device.

18. The computer-readable storage medium of claim 17, wherein the instructions that cause the one or more processors to select the communication channel for sending the request to perform the management action to the second computing device further cause the one or more processors to:

select one of: the Internet or a direct wireless connection between the computing device and the second computing device as the communication channel for sending the request to perform the management action to the second computing device.

* * * * *